US008581956B2

(12) United States Patent
Robinson et al.

(10) Patent No.: US 8,581,956 B2
(45) Date of Patent: Nov. 12, 2013

(54) METHODS AND SYSTEMS FOR COMMUNICATING FOCUS OF ATTENTION IN A VIDEO CONFERENCE

(75) Inventors: Ian N. Robinson, Pebble Beach, CA (US); Mary G. Baker, Palo Alto, CA (US); Ramin Samadani, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 286 days.

(21) Appl. No.: 13/097,753

(22) Filed: Apr. 29, 2011

(65) Prior Publication Data

US 2012/0274736 A1 Nov. 1, 2012

(51) Int. Cl.
*H04N 7/14* (2006.01)
(52) U.S. Cl.
USPC ........................................................ 348/14.06
(58) Field of Classification Search
USPC .......................................... 348/14.01–14.16
See application file for complete search history.

(56) References Cited

U.S. PATENT DOCUMENTS

| 6,806,898 B1 * | 10/2004 | Toyama et al. | 348/14.16 |
| 2003/0218672 A1 * | 11/2003 | Zhang et al. | 348/14.16 |
| 2005/0168402 A1 | 8/2005 | Culbertson et al. | |
| 2007/0188596 A1 * | 8/2007 | Kenoyer | 348/14.08 |
| 2010/0208078 A1 * | 8/2010 | Tian et al. | 348/169 |
| 2011/0085017 A1 * | 4/2011 | Robinson et al. | 348/14.08 |

OTHER PUBLICATIONS

Gemmell et al~"Gaze Awareness for Video-conferencing: A Software Approach"~IEEE Multimedia Oct./Dec. 2000~pp. 26-35.
Gemmell et al~"Implementing Gaze-Corrected Videoconferencing"~International Association of Science and Technology for Development~Mar. 2002~6 pages.
Vertegaal et al~"GAZE-2: An Atteentive Video Conferencing System"~CHI 2002~Apr. 2002~pp. 736-737.

* cited by examiner

*Primary Examiner* — Joseph J Nguyen
*Assistant Examiner* — Sunita Joshi

(57) ABSTRACT

Methods and systems for communicating each participant's focus of attention in a video conference are described. In one aspect, a method for communicating where each participant's attention is focused in a video conference includes receiving each remote participant's video and audio streams and focus of attention data, based on the remote participant's head location. The at least one remote participant's video streams are presented in separate viewing areas of the local participant's display. The viewing areas presenting the remote participants are modified to indicate to the local participant each remote participant's focus of attention, based on the focus of attention data.

19 Claims, 15 Drawing Sheets

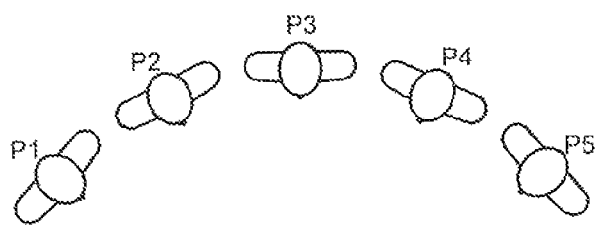
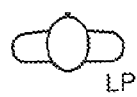
Figure 10A
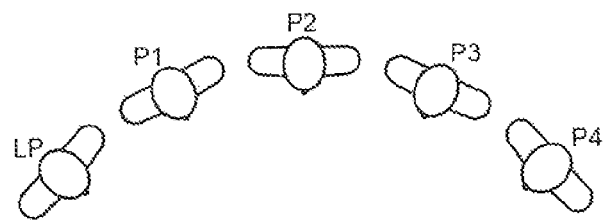
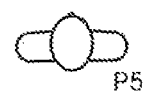
Figure 10B
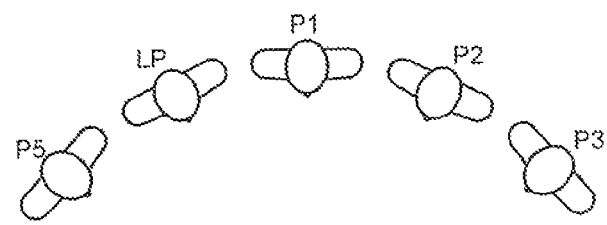
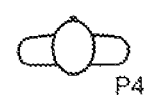
Figure 10C

METHODS AND SYSTEMS FOR COMMUNICATING FOCUS OF ATTENTION IN A VIDEO CONFERENCE

TECHNICAL FIELD

This disclosure relates to video conferencing.

BACKGROUND

Video conferencing enables participants located at different sites to simultaneously interact via two-way video and audio transmissions. A video conference can be as simple as a conversation between two participants located at different sites or involve discussions between many participants located at different sites and may include shared content such as a video presentation or slides. As high-speed network connectivity is becoming more widely available at lower cost and the cost of video capture and display technologies continues to decrease, video conferencing conducted over networks between participants in faraway places is becoming increasing popular.

Video-conferencing systems are typically designed to provide natural interactions between the participants. Desired attributes of these systems include a natural frontal view with correct eye contact and eye gaze and the ability to interact on a shared surface. However, video conferencing systems are typically engineered to communicate an approximation of eye contact when participants are facing the screen. As a result, each participant perceives that the other participants are looking at them all the time. This way of presenting the participants often leads to doubt as to whether or not participants are actually listening carefully to the discussion. For instance, a speaking participant may feel compelled to ask certain other participants for verbal confirmation that they are paying attention during the video conference, even if the participants appear to be looking directly at the speaking participant. In addition, participants are unable to determine where the other participants are focusing their attention, which makes it difficult for participants to follow the flow of the conversation. Thus, designers and users of video conference technologies continue to seek improvements to the video-conferencing experience.

BRIEF DESCRIPTION OF THE DRAWINGS

FIGS. 10A-10C show an example round table ordering of the participants from the point of view of three participants.

DETAILED DESCRIPTION

Figure 1:
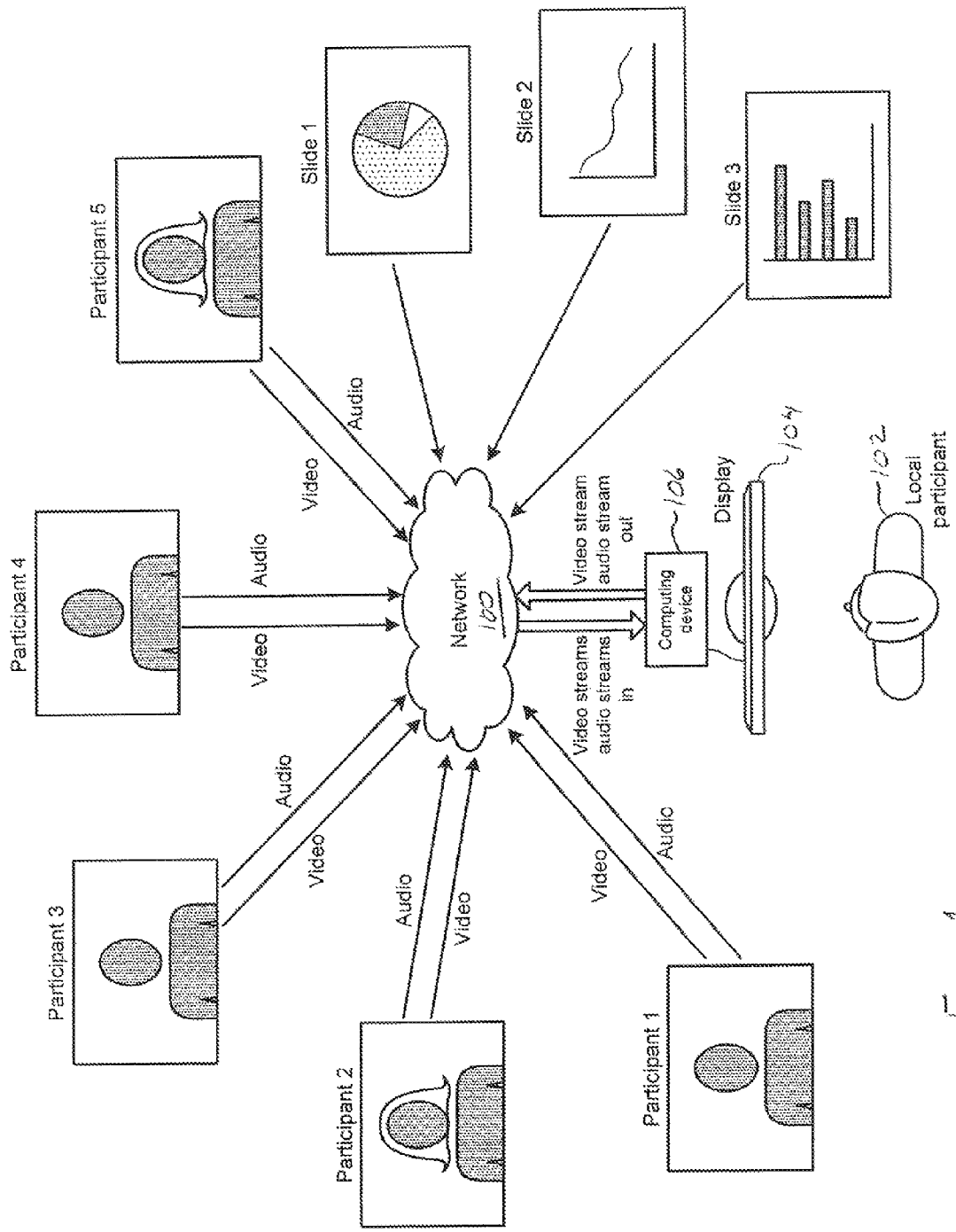
FIG. 1 shows an example representation of video and audio streams associated with an example video conference from the point of view of a local participant.

Methods and systems for communicating each participant's focus of attention in a video conference are now described. FIG. 1 shows a representation of video and audio streams associated with an example video conference from the point of view of a local participant 102 interacting with five remote participants. The video conference is conducted over a network 100 that can be a local area network, a wide area network, a metropolitan area network, a global area network, or the Internet. In the example of FIG. 1, the local participant 102 uses a desktop computer including a display 104 connected to a computing device 106 to participate in the video conference. Other means for presenting and interacting with the participants can be used without departing from the methods and systems described below. For example, the display 104 can be replaced by a screen and a projector, or the desktop computer can be replaced by a laptop computer, a tablet computer, or a smartphone. The five remote participants 1-5 can also use any combination of desktop, laptop, or tablet computers or smartphones to participate in the video conference. The video and audio streams generated by the local participant 102 during the video conference are sent to the network 100. The video and audio streams generated by each of the remote participants are sent to the network 100 with the video streams to be presented on the display 104 in separate viewing areas identified as participants 1-5. Shared video content identified as slides 1, 2, and 3 can be provided by any one or more of the participants with each slide to be presented on the display 104 in a separate viewing area. The remote participants' audio streams can be blended into a combined audio to be heard by the local participant 102 using headphones or to be heard using loud speakers connected to the computing device 106.

Methods include arranging the viewing areas of the participants and the slides on the display 104 and maintaining the relative positions of the viewing areas during the video conference. The methods include collecting information about the local participant's head position and/or head orientation to determine a focus region of the display corresponding to where the local participant's focus of attention is on the display 104 during the video conference. The focus region is then communicated to the other participants so that each participant knows in real time where the local participant's attention is focused on the display 104.

Note that for the sake of simplicity, the following description is directed to determining the local participant's focus of attention during the video conference. In practice, the focus of attention of each remote participant is similarly determined and sent to the other remote participants and the local participant so that each participant is aware of where the other participants are looking or focusing their attention during the video conference.

Figure 2:
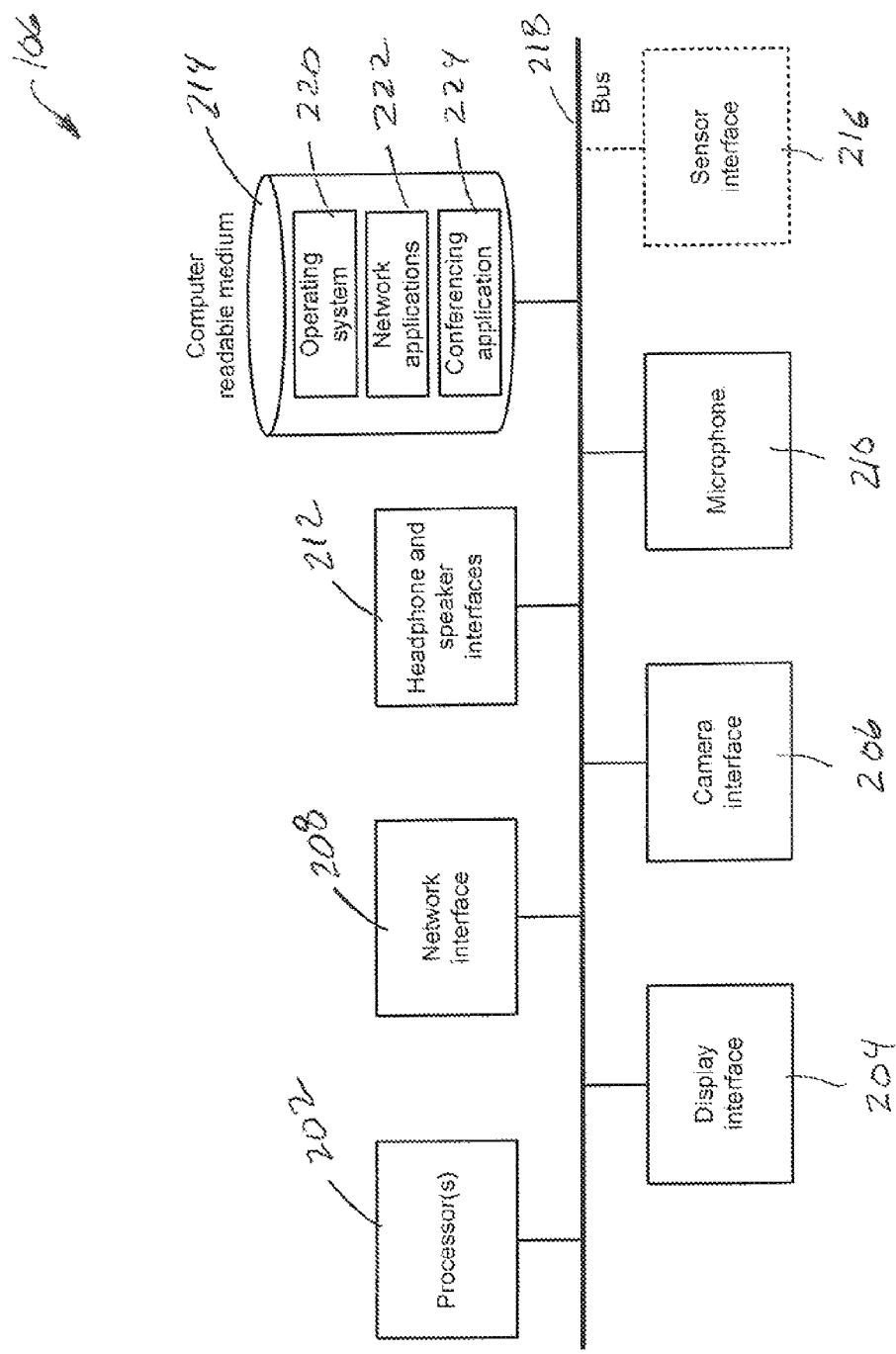
FIG. 2 shows an architecture of an example computing device.

Methods described herein use various components and features of the computing device 106 to determine where the local participant's attention is focused on the display 104. Consider first the architecture and components of the example computing device 106 shown in FIG. 2. The device 106 includes one or more processors 202, a display interface 204, a camera interface 206, a network interface 208, a microphone interface 210, headphone port and speaker interfaces 212, a computer-readable medium 214, and may include a sensor interface 216. The camera interface 206 can support at least one camera. The at least one camera can be embedded within the frame of the display 104, mounted along at least one of the edges of the display 104, mounted in suitable locations in the room which the display 104 is located. When more than one camera is used to capture images of the local participant a better sense of eye contact can be created with the local participant 102. For example, when the local participant is positioned to focus his attention on a particular region of the display 104, the camera located closest to where the local participant is focusing his attention can be active to create a sense of eye contact with the local participant 102. The sensor interface 216 may be connected to one or more proximity sensors, one or more infrared cameras, one or more depth cameras, or stereo cameras to determine the position and/or orientation of the local participant's head. Note that the at least one camera with face detection methods can be used without sensor information to determine the head position and/or orientation of the local participant 102. Each of these interfaces and components is operatively coupled to one or more buses 218.

The computer-readable medium 214 can be any suitable medium that provides instructions to the processors 202 for execution. For example, the computer-readable medium 214 can be non-volatile memory, such as flash memory, an optical or a magnetic disk; and includes volatile memory. The computer-readable medium 214 can store software applications, including word processors, browsers, email, Instant Messaging, media players, and telephone software. The computer-readable medium 214 may also store an operating system 220, such as Mac OS, MS Windows, Unix, or Linux; network applications 222; and a video-conferencing application 224. The operating system 224 can be multi-user, multiprocessing, multitasking, multithreading, and real-time. The operating system 220 can also perform basic tasks such as recognizing input from the microphone, cameras, and sensors; output video streams to the display; keep track of files and directories on the medium 214; control the cameras and sensors; and manage traffic on the one or more buses 218. The network applications 222 include various components for establishing and maintaining network connections, such as computer-readable instructions for implementing communication protocols using a wireless network. The video conference application 224 provides various software components for sending and receiving video and audio streams and head position and/or orientation information between participants as described below.

Figure 3:
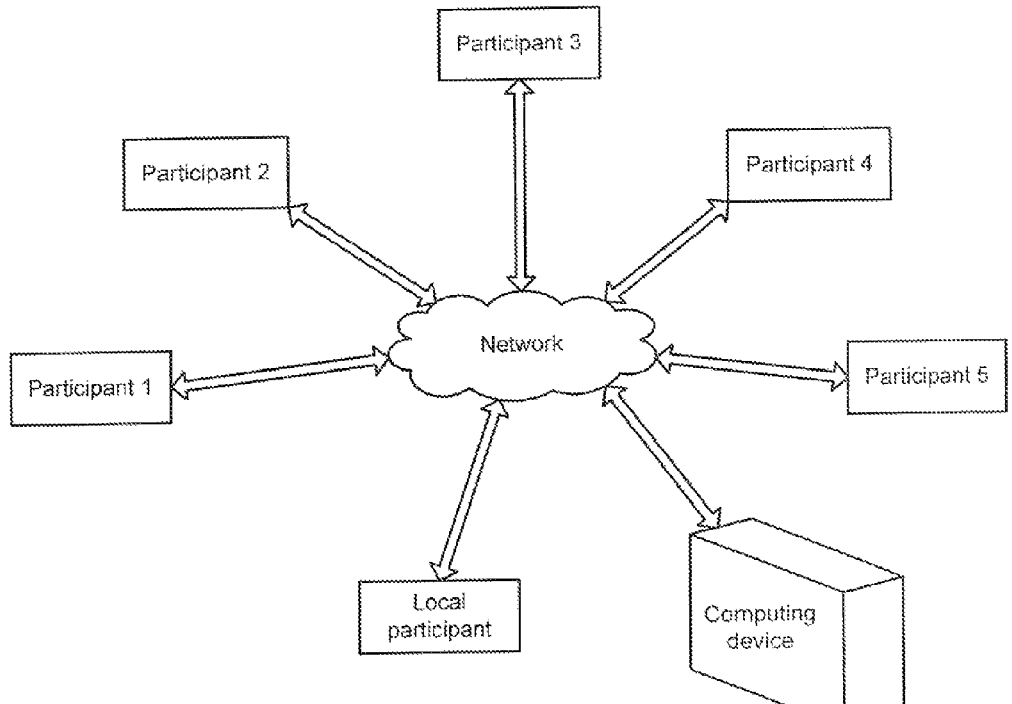
FIG. 3 shows a diagram of an example client-server network to conduct a video conference between six participants.

The video conference can be conducted using a client-server network. FIG. 3 shows a diagram of an example client-server network 300 to conduct a video conference between the six participants. In the example of FIG. 3, each remote participant has video conferencing equipment that includes a camera, a microphone, a display, sensors, and a computing device that runs a client-side video conferencing application that sends video and audio streams and focus of attention data generated by the participant to a centralized computing device 302 via the network 100. The computing device 302 can be operated by one of the participants or can be located at a separate location. The device 302 receives the video and audio streams and the focus of attention data from each of the participants and includes a server-side video conferencing application that processes and sends to each participant the video and audio streams and focus of attention data of the other participants and sends any shared content to the participants. For example, the server-side application sends the video and audio streams and focus of attention data generated by the remote participants 1-5 to the local participant 102 and sends the video and audio streams and focus of attention data generated by the local participant 102 to the participants 1-5. The client-side application run by each remote participant presents the video streams, plays the combined audio of the other participants, and indicates where each participant has focused their attention, and may allow the participants to arrange the viewing areas of the other participants as desired. A video conference can be initiated by one of the participants logging into the server-side application via a client-side application. The server-side application then manages each participant that leaves or enters the video conference and can send an appropriate notice to the participants when a participant leaves or enters the video conference.

Figure 4:
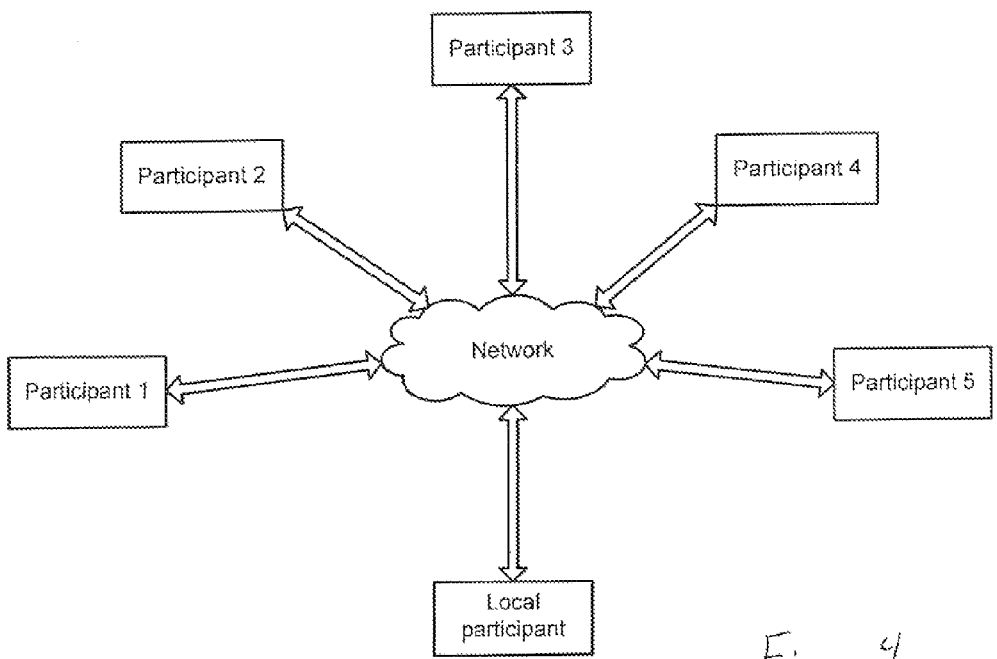
FIG. 4 shows a diagram of an example peer-to-peer network to conduct a video conference between six participants.

Alternatively, the video conference can be conducted using a peer-to-peer network. FIG. 4 shows a diagram of an example peer-to-peer network 400 to conduct a video conference between the six participants. Each participant runs the same copy of a peer-to-peer video conferencing application locally and the video conferencing tasks are distributed between the participants. Video and audio data streams and focus of attention data are generated by each participant. The video conferencing application enables each participant to connect with another participant's computing device via the network 100 to access the video and audio stream and focus of attention data generated by the other participants. For example, when a video conference is established between the six participants shown in FIG. 4, local participant 102 has access to each of the remote participants computing devices to download the video and audio streams and focus of attention data generated by the remote participants. The video conference can be initiated by a first participant executing the peer-to-peer video conferencing application. After launching the application, the first participant identifies a second participant to conference with and the second participant is sent a notification prompting the second participant to enter the video conference with the first participant. When the second participant accepts the conference with the first participant, the video conferencing applications exchange video and audio streams and focus of attention data. A third participant can join the video conference where each participant receives video and audio streams from the other two participants and sends locally generated video and audio streams to the other two participants. Any shared content provided by a participant is sent to or accessed by the other participants.

Figure 5B:
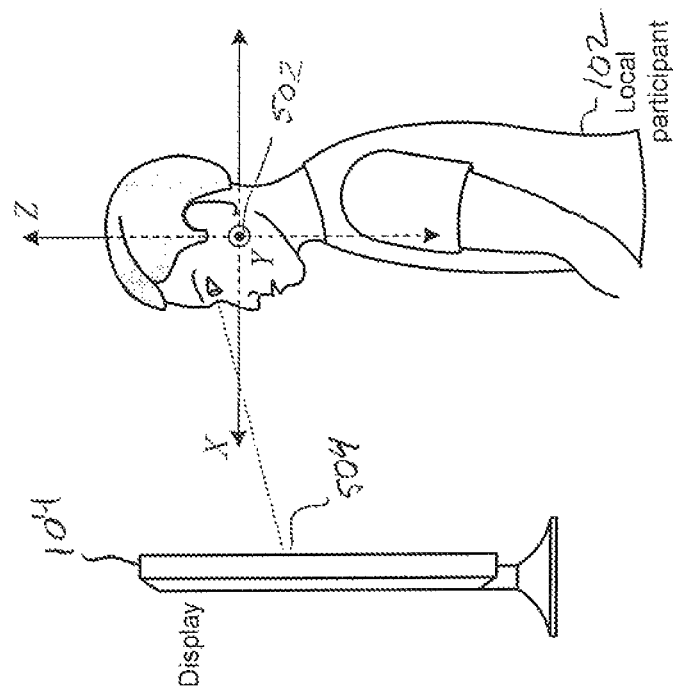
FIGS. 5A-5B show an example of a fixed Cartesian coordinate system for tracking head position and orientation of a participant.
Figure 5A:
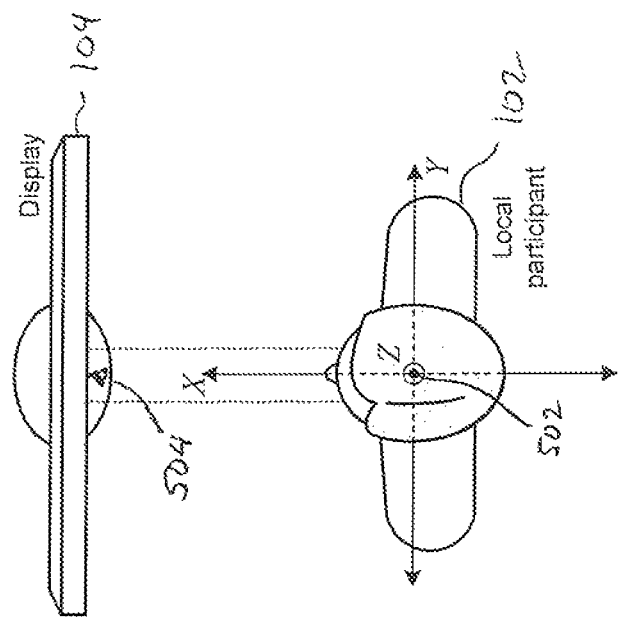
Figure 6B:
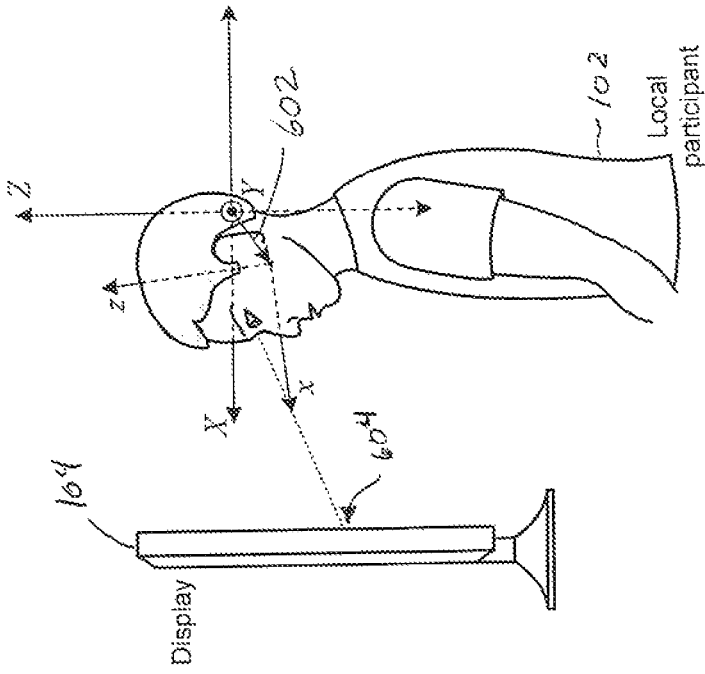
FIGS. 6A-6B show views of example translational and rotational changes in a local participant's head position and orientation.
Figure 6A:
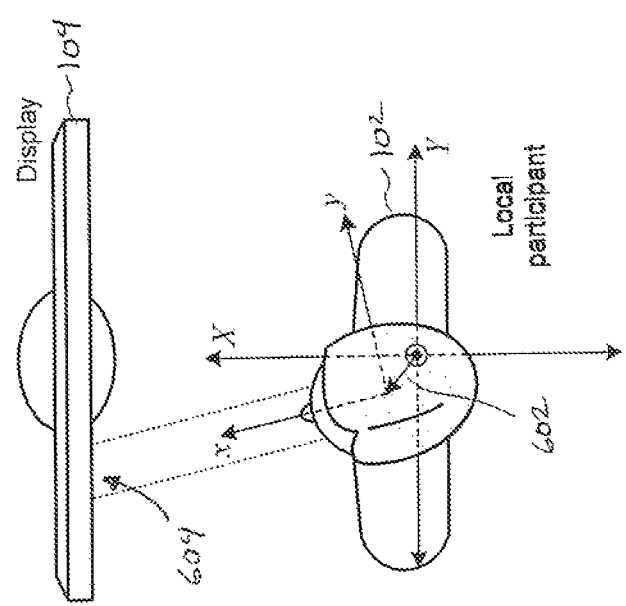

Methods include determining where the local participant's attention is focused on the display by tracking changes in the local participant's head position and/or head orientation and do not depend on where the local participant's eyes appear to be looking. In other words, the local participant's gaze is not a factor in determining the where the local participant's attention is focused on the display 104. The local participant's head position and/or orientation can be tracked using one or more input devices, such as a video camera, one or more proximity sensors, one or more infrared cameras, one or more depth cameras, stereo cameras, or using information provided by any combination of two or more input devices. The cameras and sensors can be mounted in suitable locations within the border of the display 104, mounted in suitable locations around the perimeter of the display, mounted in various places in a room where the local participant 102 is located, or worn by the local participant. When the video conference is initiated, the input devices are used to capture information about the initial head position and/or orientation of the local participant 102. For example, the local participant's head position can be obtained using a face detection method on the video stream output from the video camera or by using information provided by a depth camera. FIGS. 5A-5B show an example of fixed Cartesian coordinate system with X, Y, and Z coordinate axes for tracking the head position of the local participant. In the example of FIGS. 5A-5B, the initial head position of the local participant 102 is determined and the origin 502 of the coordinate system is set near the approximate center of the local participant's head. In practice, the origin of the coordinate system can be placed in any convenient location, such as where one of the input devices is located or the center of the display. The participant's head position and/or orientation is tracked periodically using the information collected by the one or more input devices. Based on the local participant's head position and/or orientation, a focus region is identified. The focus region is the region or portion of the display 104 where the local participant's attention is focused. For example, as shown in FIGS. 5A-5B, based on the position and/or orientation of the local participant's head, a focus region 504 of the display 104 is identified. The information provided by the input devices can be used to detect translational and/or rotational changes in the local participant's head to track changes in the focus region during the video conference. FIGS. 6A-6B show XY- and XZ-plane views of a translation and rotational change in the local participant's head position. In FIGS. 6A-6B, the local participant 102 has undergone a translational change in position as represented by a vector 602. FIGS. 6A-6B also include a second set of x, y, and z coordinate axes that are fixed with respect to the local participant's head to determine the rotational change in the local participant's head with respect to the fixed X, Y, and Z coordinate axes. The translational and rotational changes in the local participant's head position result in a different focus region 604.

Figure 7A:
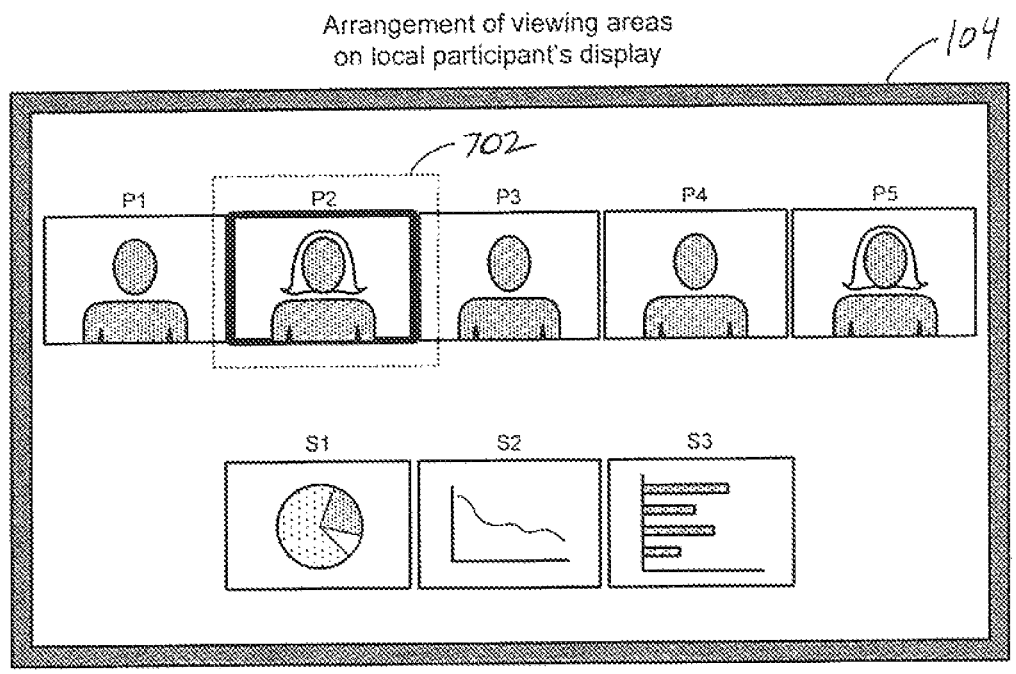
FIGS. 7A-7B show an example arrangement of viewing areas and a focus region associated with a local participant's head position and orientation.
Figure 7B:
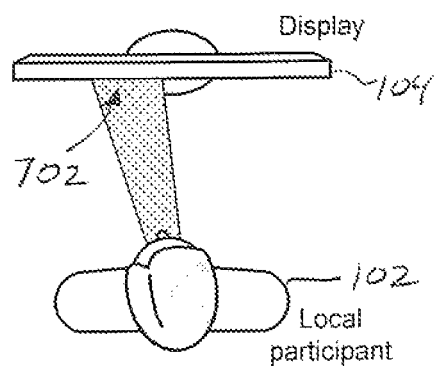

Once the video conference is initiated, methods include arranging the viewing areas of the participants and the slides on the display 104 and maintaining the relative positions of the viewing areas during the video conference. FIG. 7A show an example arrangement of the viewing areas presented on the local participant's display 104. In FIG. 7A and in subsequent figures, the remote participants 1-5 are identified as P1, P2, P3, P4, and P5 and the slides are identified as S1, S2, and S3. The method includes collecting information about the local participant's head position and/or head orientation to determine where the local participant's attention is focused on the display 104 during the video conference. FIG. 7B shows a top view of the local participant's head turned to focus on a focus region 702. As shown in the example of FIG. 7A, the focus region 702 is the viewing area of participant 2. The focus region associated with the local participant 102 is communicated to the remote participants so that each of the remote participants knows where the local participant's attention is focused during the video conference. In systems in which multiple cameras are positioned to capture images of the local participant from different angles, methods include switching to the camera that is positioned closest to the current focus region of the local participant. As a result, the remote participant whom the local participant 102 is focusing their attention on better perceives eye contact with the local participant 102.

Methods include providing the local participant with feedback regarding where the local participant's attention is determined to be focused during the video conference. The feedback can be used by the local participant to correct his/her focus of attention so that the other participants are aware of where the local participant is focusing his/her attention. For example, as shown in FIG. 7, suppose participant 2 is speaking. With feedback regarding where the method has determined the local participant's focus region, the local participant 102 is assured that his focus of attention to be presented to the other participants is on participant 2, or if feedback indicates to the local participant 102 that his focus region is not on participant 2, the local participant 102 can adjust his head position, orientation, and distance from the display 104 to place his focus region on participant 2 so that the other participants are aware that the local participant 102 is focusing his attention on participant 2. The feedback presented to the local participant 102 can be in the form of a marker. For example, as shown in FIG. 7A, the border surrounding the viewing area of participant 2 is thicker than the borders of the viewing areas outside the focus region 702. Alternatively, the focus region can be used to provide an enhanced view. For example, the viewing area of participant 2 can be in color while the viewing areas of the other participants and slides are in black and white. Also, the portion of the display that lies within the focus region can appear enlarged with respect to the other viewing areas presented on the display 104 as described in Published U.S. Patent Application 2011/0085017, published Apr. 14, 2011, owned by the Hewlett Packard Co., and filed on Oct. 9, 2009, which is incorporated herein by reference.

Figure 8A:
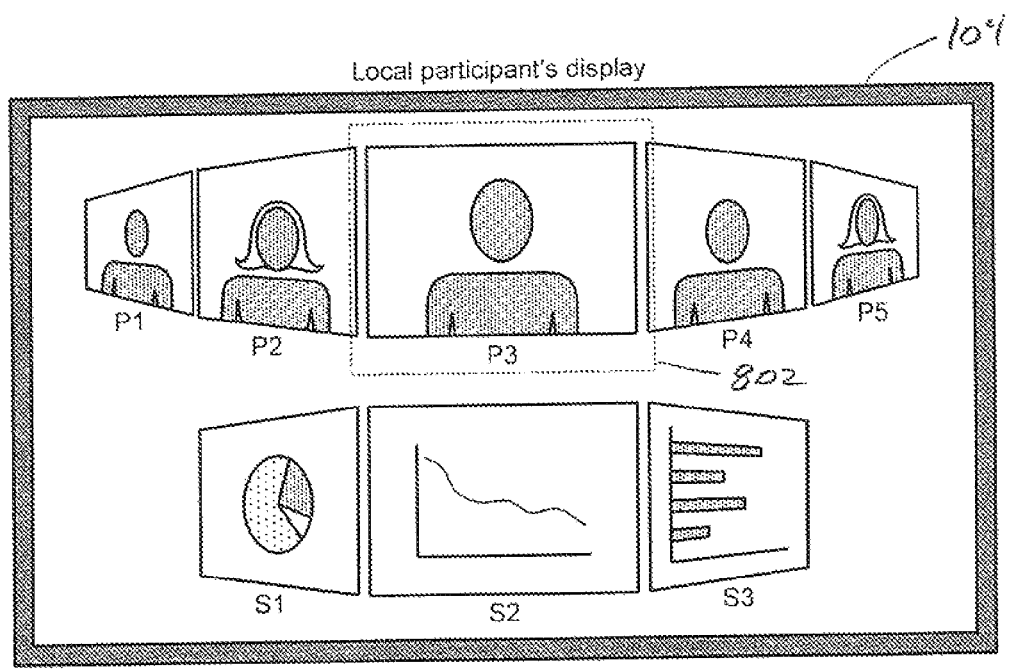
FIGS. 8A-8D show example arrangements of viewing areas and a focus region associated with a local participant's head position and orientation.
Figure 8B:
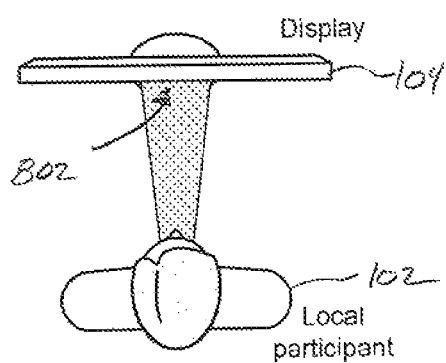
Figure 8C:
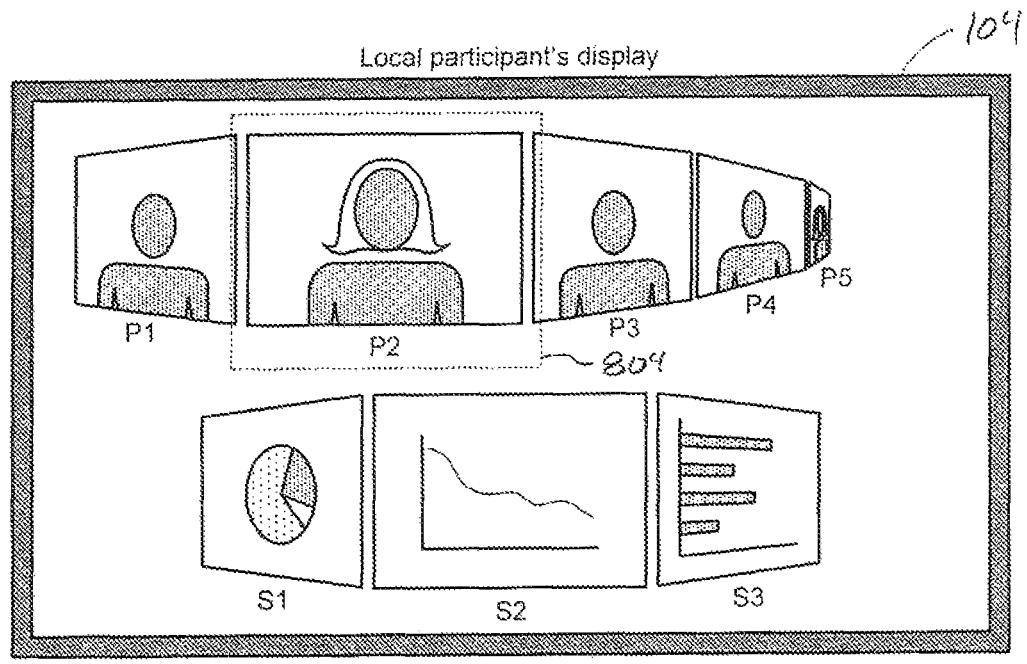
Figure 8D:
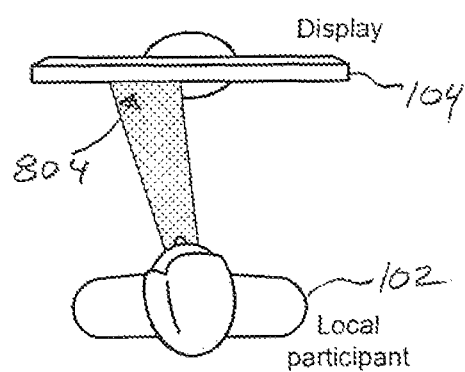

Alternatively, rather than displaying the participants in a row, as shown in FIG. 7A, the participants can be displayed as if the associated viewing areas are located along the outside edge of a first wheel and the slide viewing areas are located along the outside edge of a second wheel. FIG. 8A show an example arrangement of the viewing areas presented on the local participant's display 104. The participant viewing areas appear to be located along the outside edge of a first wheel and slide viewing areas appear to be located along the outside edge of a second wheel. FIG. 8B shows a top view of the local participant's head position. FIGS. 8A and 8B reveal that the local participant's focus region 802 is located on participant 3. As a result, the viewing areas of the participants appear to have been rotated so that participant 3 is facing the local participant 102 with the viewing areas associated with remote participants appearing to recede from the focus region 802. FIGS. 8C-8D show the local participant's display 104 and top view of the local participant 102, respectively, when the local participant's focus of attention is on a different focus region 904 of the display 104. The viewing areas of the participants appear to have been rotated so that participant 2 is facing the local participant 102.

Figure 9A:
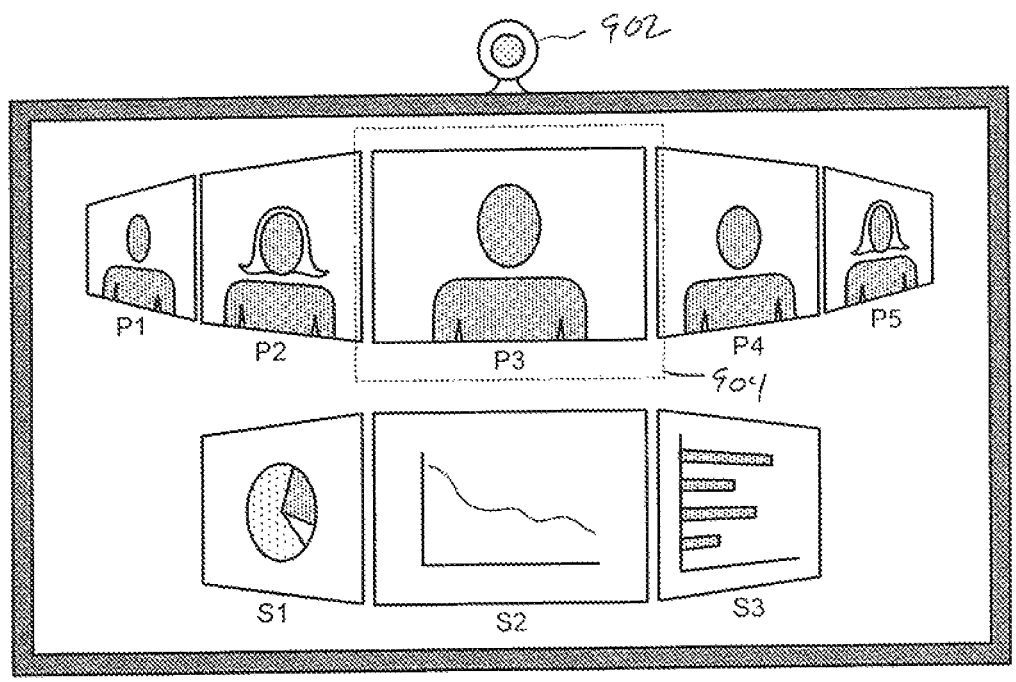
FIGS. 9A-9D show example arrangements of viewing areas and a focus region associated with a local participant's head position and orientation.
Figure 9B:
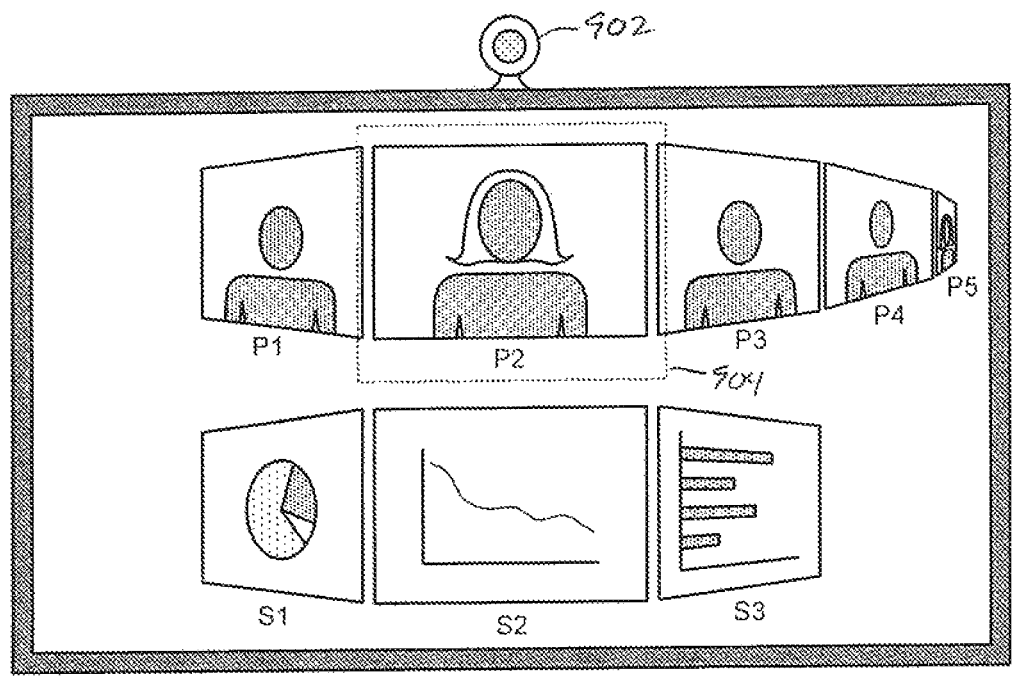
Figure 9C:
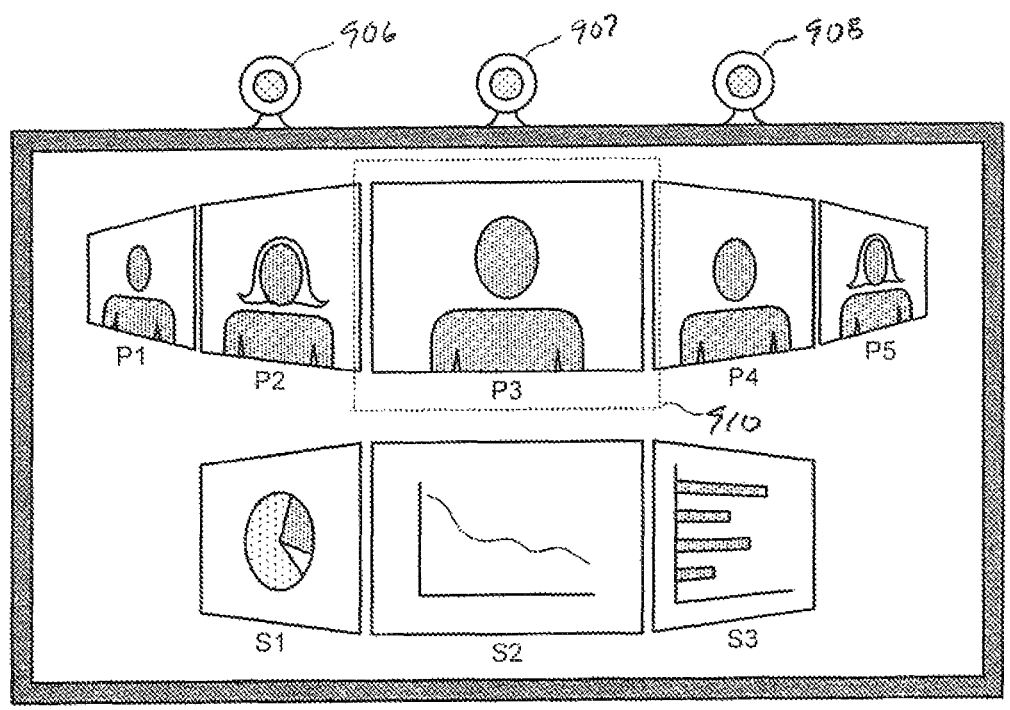
Figure 9D:
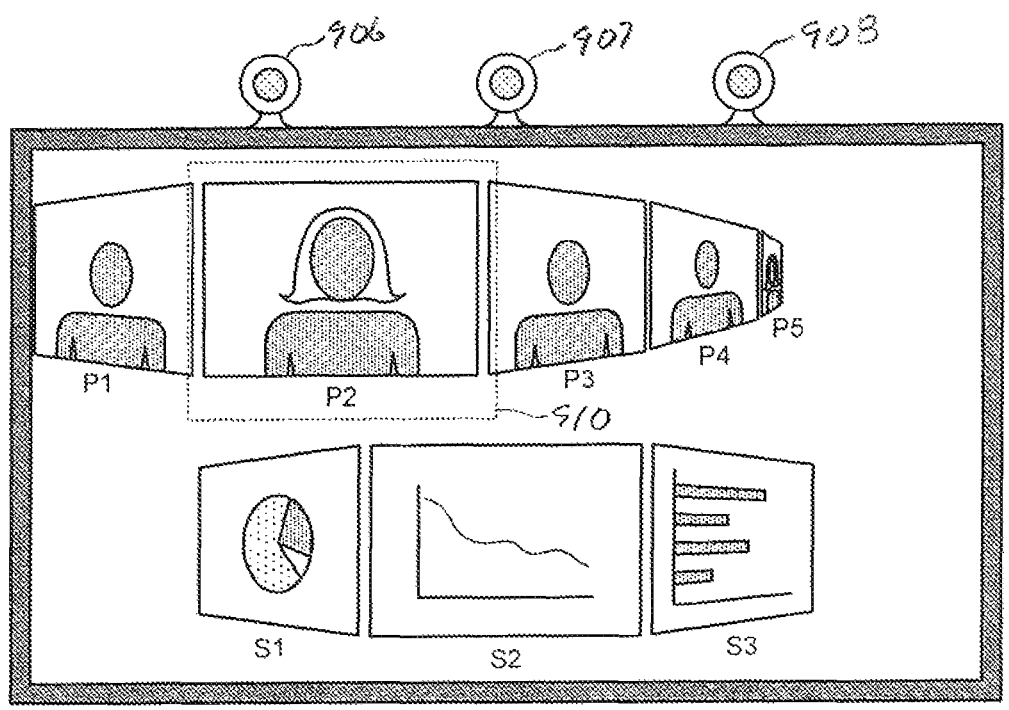

Feedback can also be used to move and/or expand the focus region in a direction closer to the camera position, or to an active camera in the case of multiple camera systems, to support better eye contact. FIGS. 9A-9B show an example of using feedback to position the viewing area of the remote participant the local participant is focusing his attention on below a camera 902 of a single camera system. In other words, the viewing areas can be repositioned on the display 104 to direct the local participant's focus region close to the camera 902. In the example of FIGS. 9A-9B, the camera 902 is represented as a separate component mounted on the frame of the display 104. A camera can also be mounted within the frame of the display 104 to obtain similar results. In FIG. 9A, the local participant's attention is focused on participant 3. As a result, the viewing area used to present participant 3's video stream is positioned close to the camera 902, which directs the local participant focus region 904 close the camera 902, enabling the camera 902 to capture front view facial images of the local participant 102 while the local participant looks at participant 3's viewing area. In FIG. 9B, the local participant's attention is focused on participant 2. As a result, the viewing area used to present participant 2's video stream is positioned close to the camera 902 to capture front view facial images of the local participant 102 while the local participant looks at participant 2's viewing area. FIGS. 9C-9D show an example of using feedback to position the viewing area of the remote participant the local participant is focusing his attention on below an active camera of a three-camera system. In other words, the viewing areas can be repositioned on the display 104 to direct the local participant's focus region close to one of the three cameras 906-908. In the example of FIGS. 9C-9D, the cameras 906-908 are represented as separate components mounted on the frame of the display 104. The cameras 906-908 can also be mounted within the frame of the display 104 to obtain similar results. In FIG. 9C, the local participant's attention is focused on participant 3. As a result, the viewing area used to present participant 3's video stream is positioned close to the central camera 907, which directs the local participant focus region 910 close the camera 902, enabling the camera 907 to capture front view facial images of the local participant 102 while the local participant looks at participant 3's viewing area. In FIG. 9D, the local participant's attention is focused on participant 2, which is located closer to camera 906. As a result, the viewing area used to present participant 2's video stream is positioned close to the camera 906, which directs the local participant focus region 910 close the camera 902, enabling the camera to capture front view facial images of the local participant 102 while the local participant looks at participant 2's viewing area.

The video conference can be arranged on every participant's display with a spatially consistent ordering. For example, the participant's can be arranged in a virtual meeting space as if the participants were seated around a round table. FIGS. 10A-10C show an example round table ordering of the participants from the point of view of three participants. FIG. 10A represents the local participant's point of view of the remote participants. FIG. 10B represents participant 5's point of view of the other participants. FIG. 10C represents participant 4's point of view of the other participants.

Figure 11A:
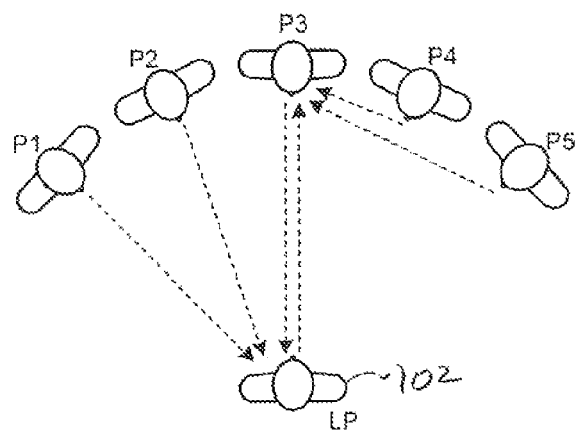
FIG. 11A shows a round table representation of how participants have focused their attention at a moment during a video conference.

The example round table ordering of the participants represented in FIGS. 10A-10C is used to describe examples of the local participant's and participant 5's focus of attention during the same example video conference. FIG. 11A shows a round table representation of a moment during a video conference where the local participant 102 is carrying on a conversation with participant 3 from the point of view of the local participant 102. Dashed line directional represent where each participant's attention is focused during the conversation. During the conversation, the local participant 102 and participant 3 are focused on each other, participants 4 and 5 are focused on participant 3, and participants 1 and 2 are focused on the local participant.

Figure 11B:
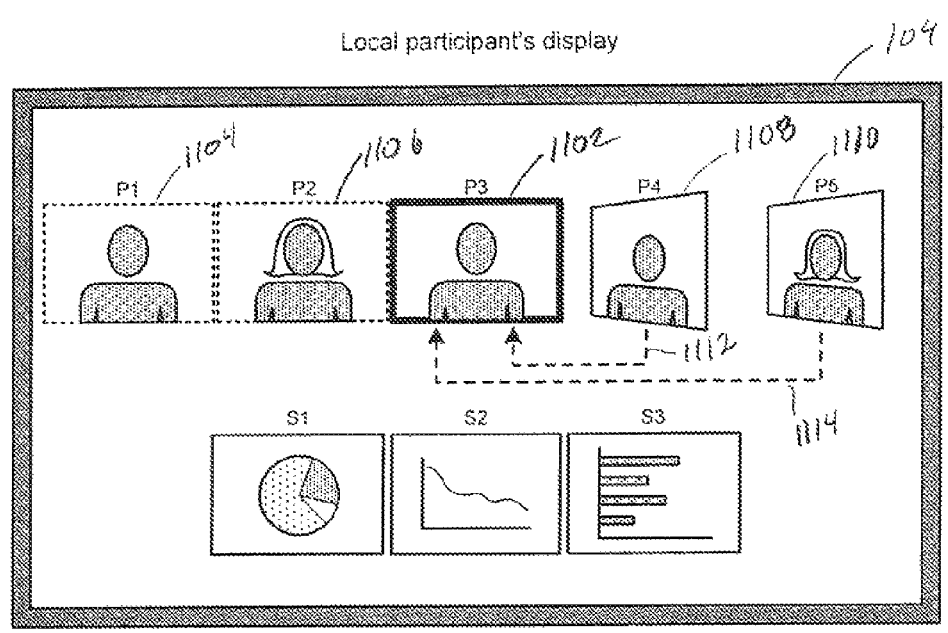
FIG. 11B shows an example of how the participants represented in FIG. 11A are displayed on a participant's display.

FIG. 11B shows an example of how the attention of the participants represented in FIG. 11A are displayed on the local participant's display. The viewing areas associated with the participants are presented in a first row, and the viewing areas associated with the slides are presented in a second row located below the first row. The viewing area 1102 of participant 3's video stream is marked to indicate that the local participant's attention is focused on participant 3 and the other participants receive the same indication. The viewing areas 1102 and 1104 associated with participants 1 and 2 are marked or highlighted (e.g., dashed line boarder) to indicate to the local participant that participants 1 and 2 are focused on the local participant's video stream presented on their respective displays. The viewing areas 1108 and 1110 associated with participants 4 and 5 are rotated toward participant 3's viewing area. In the example of FIG. 11B, the viewing areas 1108 and 1110 are presented with the same angle of rotation and dashed lines 1112 and 1114 may be included to further indicate exactly where participants 4 and 5 are focusing their attention. Alternatively, dashed lines 1112 and 1114 alone can be used to indicate that participants 4 and 5 are focused on participant 3.

In addition, the degree of rotation can be used to indicate where a remote participant's attention is focused. Using the round table ordering described above, the amount of rotation can vary from zero, which corresponds to when the remote participant is focusing on the local participant, to a maximum value corresponding to when a remote participant's attention is focused on one or other of the remote participants whose viewing areas are located next to the remote participant's on the local participant's display 104.

Figure 12A:
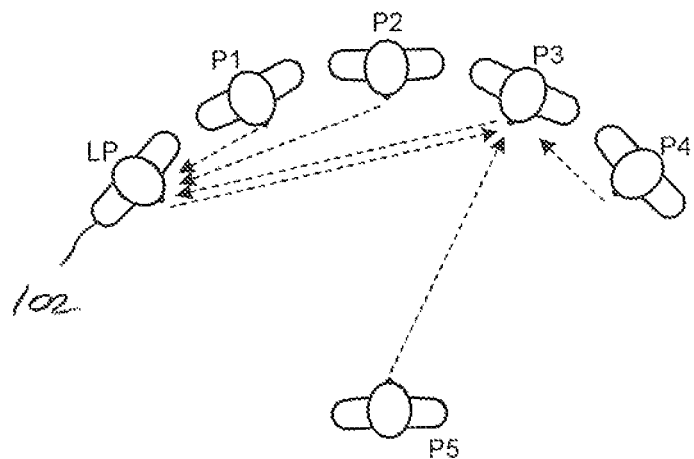
FIG. 12A shows a round table representation of how participants have focused their attention at a moment during a video conference.

FIG. 12A shows a round table representation of the same moment during the video conference represented in FIG. 11 but from the point of view of participant 5. The local participant 102 and participant 3 are focused on each other, participants 4 and 5 are focused on participant 3, and participants 1 and 2 are focused on the local participant.

Figure 12B:
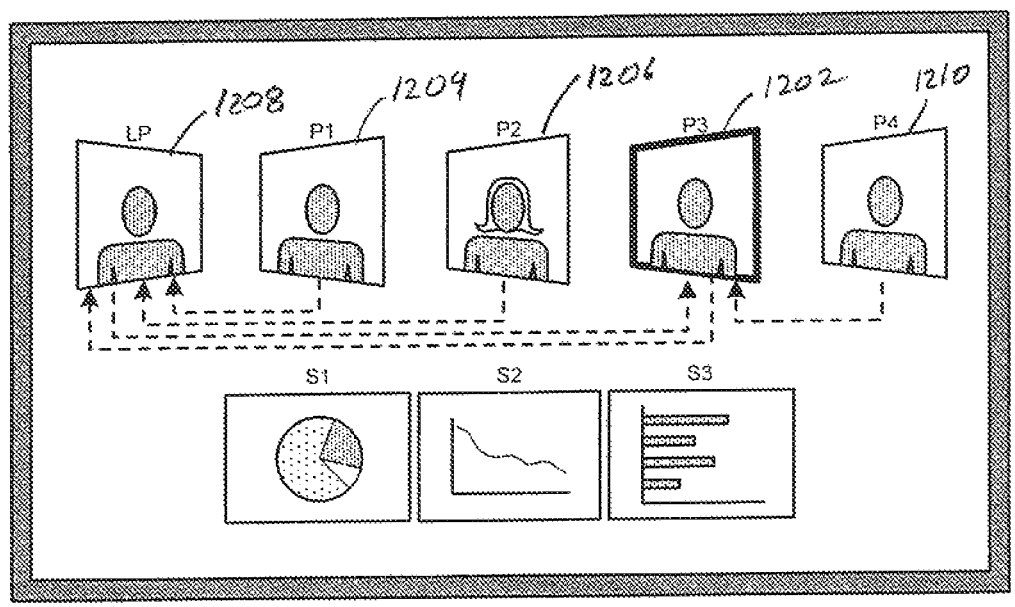
FIG. 12B shows an example of how the participants represented in FIG. 12A are displayed on a participant's display.

FIG. 12B shows an example of how the attention of the participants represented in FIG. 12A are displayed on participant 5's display. The viewing area 1202 of participant 3's video stream is marked to indicate that participant 5's attention is focused on participant 3 and the other participants receive the same indication. The viewing areas 1202, 1204, and 1206 are rotated toward the local participants viewing area 1208, and the local participants viewing area 1208 is rotated toward local participant 3. The viewing area 1210 associated with participants 4 is rotated toward participant 3's viewing area. In the example of FIG. 12B, the viewing areas 1204, 1206, 1202, and 1210 are presented with the same angle of rotation, so dashed lines directional arrows may be included to indicate exactly where the participants 1-4 are focusing their attention. Alternatively, the dashed lines alone without rotation of the viewing areas can be used to indicate the participants' focus of attention.

Figure 12C:
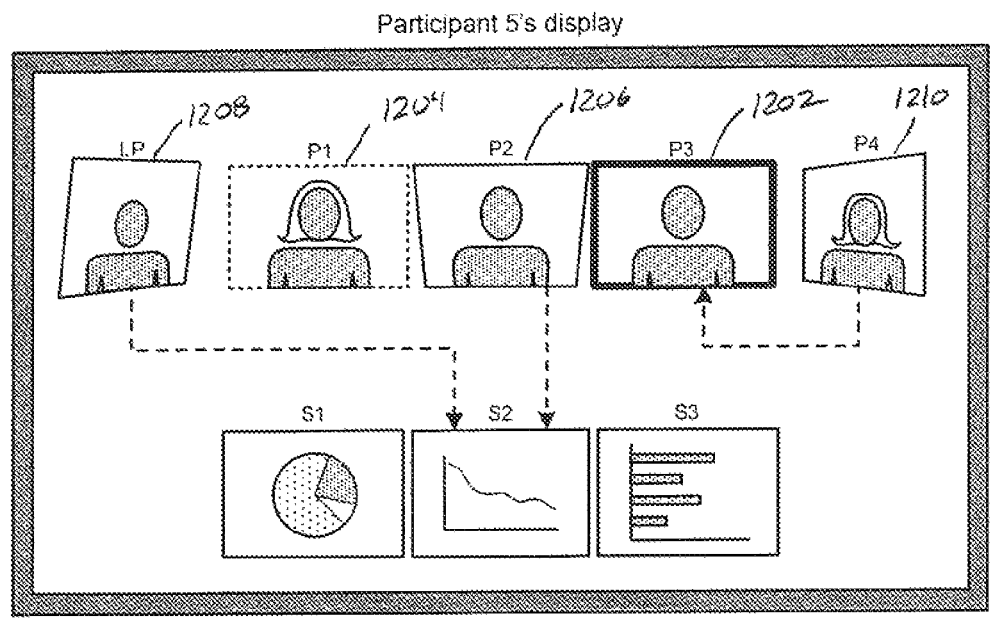
FIG. 12C shows an example of how two participants have focused their attention on shared content viewing areas.

The viewing areas of the participants can also be rotated toward the viewing areas associated with the slides to indicate which participants are looking at particular slides. FIG. 12C shows an example of how the local participant and participant 2 have focused their attention on the viewing area for slide 2. In particular, the local participants viewing area 1208 is rotated toward the viewing area of slide 2 and the viewing area 1206 of participant 2 is rotated directly downward toward slide 2. As shown in FIG. 12C, dashed line directional arrows can be used alone or in combination with the rotated viewing areas to indicate how the participants are focusing their attention.

Figure 13:
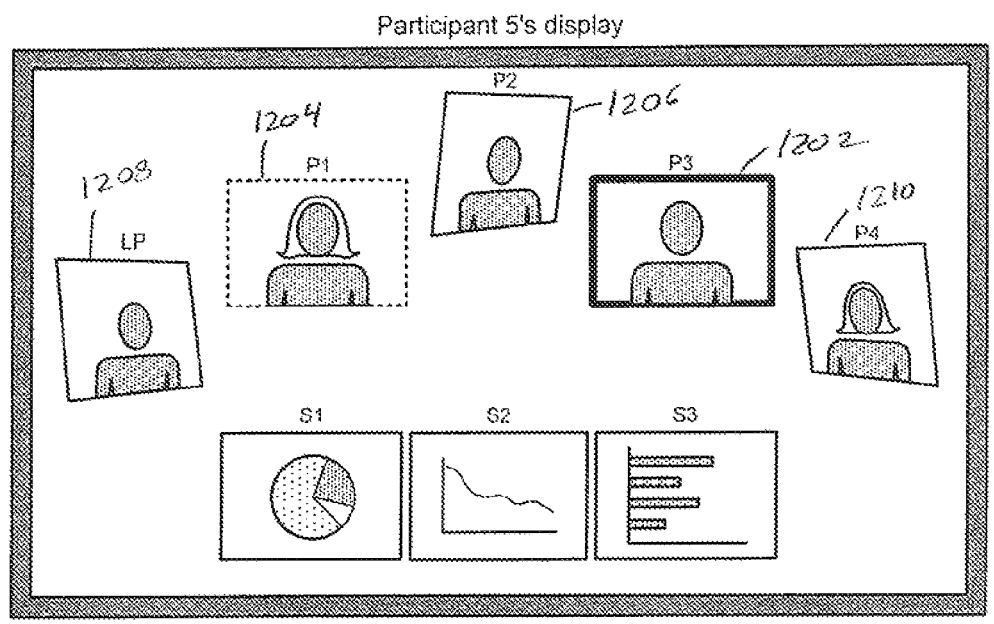
FIG. 13 shows an example nonlinear arrangement of viewing areas presented on a participant's display.

The viewing areas are not limited to being arranged in rows. Other convenient arrangements can be used in combination with rotating the viewing areas to convey each participant's focus of attention. FIG. 13 shows an example nonlinear arrangement of the viewing areas of the participants presented on participant 5's display. In the example of FIG. 13, viewing area for participant 3 is marked to indicate that participant 5 is focused on participant 5, participant 4's viewing area is rotated toward slide 2, the local participant's viewing area is rotated toward participant 1 and participant 2's viewing area is rotated toward participant 3.

Rather than rotating the two-dimensional viewing areas to indicate a participant's focus of attention, the participants presented in the viewing areas can be represented by three-dimension models, and the three-dimensional models appear to rotate about an axis of rotation rather than rotating the viewing areas. Alternatively, each of the participants can have a row of three or more cameras embedded within or located along the top edge of their respectively displays. The view captured by the camera that is closest to conveying the focus of attention of the participant is presented in the viewing areas of the other participants, as described above with reference to FIGS. 2 and 9.

Methods can also include a distinction between when a participant is actively positioning their focus of attention from when the participant is readjusting their seating position to a more comfortable neutral position and not actively looking at a particular participant or slide. The active situation can be signaled by the participant holding down a key on the keyboard or by sensing when the participant leans in closer to the display (e.g., using depth information). On the display of the other participants, an inactive participant can be indicated by tilting their viewing area downward or using the inactive participant's distance from the screen to convey the width of their focus region. As a result, leaning backward widens the focus area until the focus area encompasses the entire width of the screen.

Methods can also include allowing a participant to use their focus region as a way of getting another participant's attention. For example, to form a sideband conversation between a first participant and a second participant, the first participant actively looks at the viewing area of the second participant. A frame can be added to the second participant's display to indicate that the first participant would like to have a sideband conversation.

Figure 14:
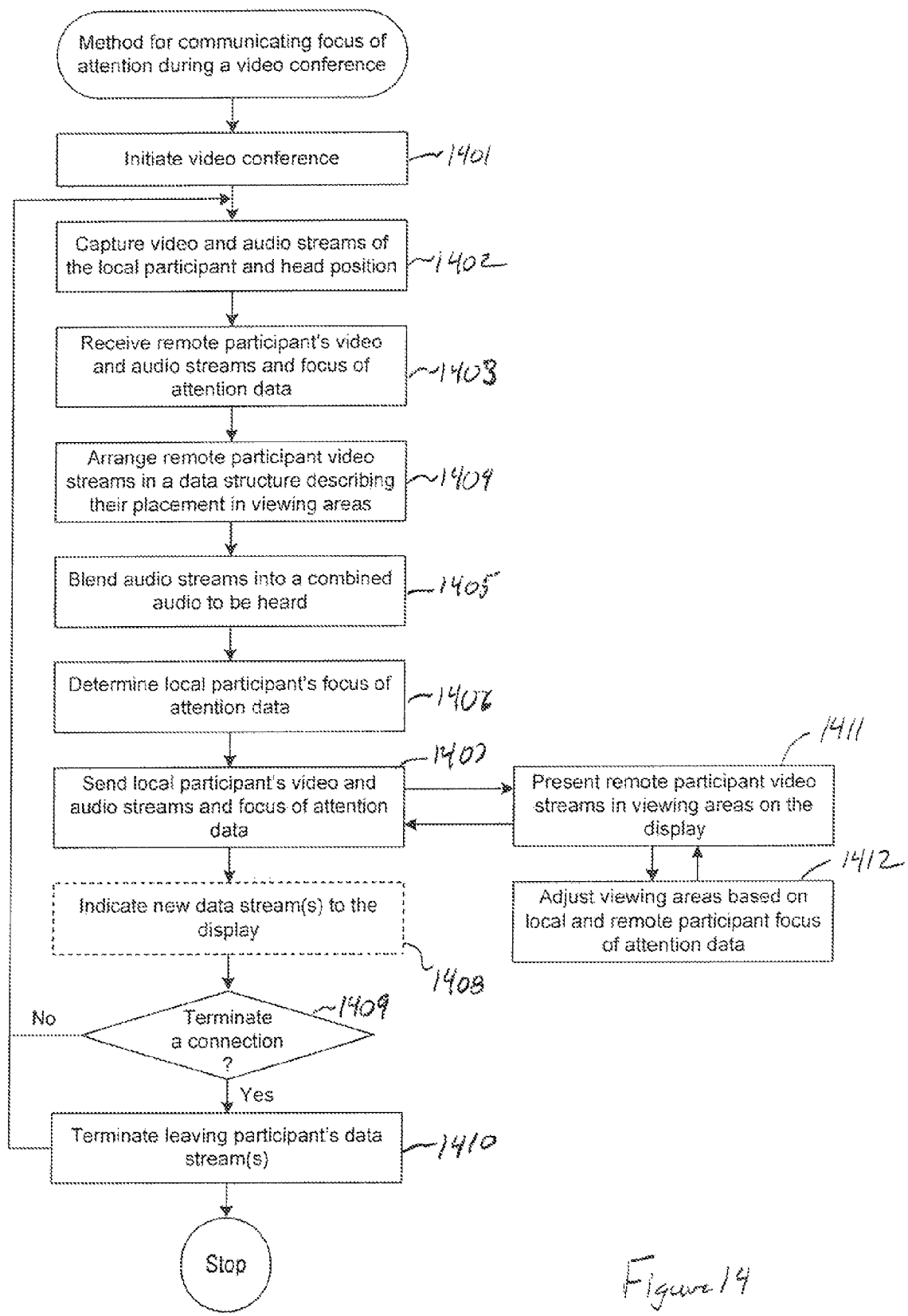
FIG. 14 shows a control-flow diagram of an example method for communicating focus of attention in a video conference.

FIG. 14 shows a control-flow diagram of an example method for communicating focus of attention during a video conference. In block 1401, a video conference between a local participant and at least one remote participant is initiated, as described above with reference to FIGS. 3 and 4. In block 1402, video and audio streams and head position and/or orientation of the local participant are captured using at least one input device and microphone. In block 1403, the local participant receives video and audio streams and focus of attention data associated with the at least one remote participants via a network, as described above with reference to FIGS. 3 and 4. In block 1404, the remote participant video stream(s) are arranged in a data structure that describes placement of the video streams on the local participant's display. In block 1405, the remote participant audio streams are blended into a combined audio stream to be heard by the local participant. In block 1406, the local participant's focus of attention on a focus region is determined using the image captured by the camera or using the information captured by other input devices, as described above with reference to FIGS. 2 and 5-9. In block 1407, the local participants video and audio stream and focus of attention data are sent to the at least one remote participants via a network, as described above with reference to FIGS. 3 and 4. In block 1408, an indicator is presented on the display to indicate when a new participant is joining the video conference. In block 1409, when a remote participant terminates participation in the video conference, the method proceeds to block 1410. Otherwise, the method repeats the operations of blocks 1402-1408. In block 1410, a leaving participant's video and audio data streams are terminated. In block 1411, the remote participant video streams are presented in the viewing areas on the display, as described above with reference to FIG. 7-9. In block 1412, the viewing areas are adjusted to represent the at least one remote participant's focus of attention and the local participant's focus of attention based on the remote and local participant focus of attention data.

Methods for communicating focus of attention are not intended to be limited to the particular arrangement of blocks described below. The arrangement of blocks shown in FIG. 14 represents only one of many different arrangements for the blocks. The block can be arranged in a number of different orderings without parting from the method for communicating focus of attention during a video conference.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents:

The invention claimed is:

1. A method for assessing and communicating where each participant's attention is focused in a video conference using a computing device, the method comprising:
  receiving each remote participant's video streams and focus of attention data, the focus of attention data to represent the remote participant's head location;
  presenting the at least one remote participant's video streams in separate viewing areas of the local participant's display; and
  modifying the viewing areas presenting the remote participants to indicate to the local participant each remote participant's focus of attention, based on the focus of attention data, without modifying the video streams of the remote participants to indicate to the local participant each remote participant's focus of attention.

2. The method of claim 1 further comprising:
  capturing video and audio streams of the local participant using at least one camera;
  determining the local participants focus of attention data;
  indicating on the local participant's display where the local participant's attention is focused to provide the local participant with feedback; and
  sending the video and audio streams and focus of attention data to each of the remote participants over a network.

3. The method of claim 2, wherein determining the local participant's focus of attention data further comprises determining the local participant's head position and head orientation in front of the local participant's display.

4. The method of claim 2 further comprises selecting one of the at least cameras to capture facial images of the local participant based on where the local participant's attention is focused on the display.

5. The method of claim 2 further comprises shifting the viewing areas presented on the local participant's display so that the local participant's focus region is close to an active camera of the at least one cameras, and capturing images of the local participant using the active camera.

6. The method of claim 1, wherein each remote participant's focus of attention data further comprises data that identifies where each participants attention is focused on their display.

7. The method of claim 1, wherein modifying viewing areas to indicate to the local participant where each participant's attention is focused further comprises for each remote participant, rotating each remote participant's viewing area toward the viewing area that presents where the remote participant's attention is focused.

8. The method of claim 1, wherein modifying the viewing areas to indicate to the local participant where each participant's attention is focused further comprises for each remote participant,
representing the remote participant in a corresponding viewing area by a three-dimension model; and
rotating the three-dimensional model toward the viewing area that presents where the remote participant's attention is focused.

9. The method of claim 1, wherein modifying the viewing areas to indicate to the local participant where each participant's attention is focused further comprises for each remote participant, presenting an arrow directed from the remote participant's viewing area to a different viewing area that represents where the remote participant's attention is focused.

10. The method of claim 1 further comprises distinguishing when a remote participant is actively positioning their focus of attention on a viewing area presented on their display from when the remote participant is readjusting their position to not actively look at a particular viewing area presented on their display, based on the focus of attention data.

11. A non-transitory computer-readable medium having instructions encoded thereon for assessing and communicating where each participant's attention is focused in a video conference, the instructions enabling one or more processors to perform the operations of:
receiving each remote participant's video streams and focus of attention data, the focus of attention data to represent the remote participant's head location;
presenting the at least one remote participant's video streams in separate viewing areas of the local participant's display; and
modifying the viewing areas presenting the remote participants to indicate to the local participant each remote participant's focus of attention, based on the focus of attention data, without modifying the video streams of the remote participants to indicate to the local participant each remote participant's focus of attention.

12. The medium of claim 1 further comprising:
capturing video and audio streams of the local participant using at least one camera;
determining the local participants focus of attention data;
indicating on the local participant's display where the local participant's attention is focused to provide the local participant with feedback; and
sending the video and audio streams and focus of attention data to each of the remote participants over a network.

13. The medium of claim 12, wherein determining the local participant's focus of attention data further comprises determining the local participant's head position and head orientation in front of the local participant's display.

14. The medium of claim 12 further comprises shifting the viewing areas presented on the local participant's display so that the local participant's focus region is close to an active camera of the at least one cameras, and capturing images of the local participant using the active camera.

15. The medium of claim 11, wherein each remote participant's focus of attention data further comprises data that identifies where each participants attention is focused on their display.

16. The medium of claim 11, wherein modifying viewing areas to indicate to the local participant where each participant's attention is focused further comprises for each remote participant, rotating each remote participant's viewing area toward the viewing area that presents where the remote participant's attention is focused.

17. The medium of claim 11, wherein modifying the viewing areas to indicate to the local participant where each participant's attention is focused further comprises for each remote participant,
representing the remote participant in a corresponding viewing area by a three-dimension model; and
rotating the three-dimensional model toward the viewing area that where the remote participant's attention is focused.

18. The medium of claim 11, wherein modifying the viewing areas to indicate to the local participant where each participant's attention is focused further comprises for each remote participant, presenting an arrow directed from the remote participant's viewing area to a different viewing area that presents where the remote participant's attention is focused.

19. The medium of claim 11 further comprises distinguishing when a remote participant is actively positioning their focus of attention on a viewing area presented on their display from when the remote participant is readjusting their position to not actively look at a particular viewing area presented on their display, based on the focus of attention data.

* * * * *